United States Patent [19]
Klauck et al.

[11] Patent Number: 6,162,839
[45] Date of Patent: Dec. 19, 2000

[54] COMPOSITION FOR PRODUCING LIGHT PLASTER, PRODUCTION OF THE FOAMING AGENT USED THEREFOR AND ITS USE

[75] Inventors: Wolfgang Klauck, Meerbusch; Hermann Kluth, Duesseldorf; Wilfried Huebner, Langenfeld; Felicitas Kolenda, Monheim, all of Germany

[73] Assignee: Henkel Kommanditgesellschaft auf Aktien, Duesseldorf, Germany

[21] Appl. No.: 09/091,798

[22] PCT Filed: Dec. 11, 1996

[86] PCT No.: PCT/EP96/05517

§ 371 Date: Aug. 11, 1998

§ 102(e) Date: Aug. 11, 1998

[87] PCT Pub. No.: WO97/25567

PCT Pub. Date: Jun. 26, 1997

[30] Foreign Application Priority Data

Dec. 20, 1995 [DE] Germany ........................... 195 47 719

[51] Int. Cl.[7] .............................. J08Q 9/06; C04B 24/10; C04B 24/24

[52] U.S. Cl. ........................... 521/83; 106/646; 106/674; 106/680; 106/776; 106/778; 106/779; 427/212; 427/221; 427/385.5; 427/388.4; 523/205; 523/211; 524/2; 524/3; 524/4; 524/5; 524/8

[58] Field of Search .............................. 521/83, 84.1, 85; 106/646, 674, 680, 776, 778, 779; 427/212, 221, 385.5, 388.4; 523/205, 211; 524/2, 3, 4, 5, 8

[56] References Cited

U.S. PATENT DOCUMENTS

| | | | |
|---|---|---|---|
| 231,151 | 7/1880 | Sanford | 106/674 |
| 1,230,085 | 6/1917 | Ashenhurst | 106/680 |
| 1,720,032 | 7/1929 | Brookby | 106/661 |
| 1,782,384 | 11/1930 | Greider | 106/677 |
| 1,912,702 | 6/1933 | Gamerra | 106/680 |
| 1,951,691 | 3/1934 | Coxon | 106/680 |
| 1,970,663 | 8/1934 | Lefebure | 106/680 |
| 2,239,925 | 4/1941 | McKee et al. | 106/680 |
| 4,018,618 | 4/1977 | Petri et al. | 106/724 |
| 4,043,825 | 8/1977 | Müller et al. | 106/680 |
| 4,102,701 | 7/1978 | Campbell et al. | 106/778 |
| 4,332,619 | 6/1982 | Grandy et al. | 106/642 |
| 4,880,898 | 11/1989 | Wahle et al. | 106/664 |
| 5,399,330 | 3/1995 | Katsumata et al. | 423/447.4 |
| 5,556,608 | 9/1996 | Katsumata et al. | 423/447.4 |

FOREIGN PATENT DOCUMENTS

| | | |
|---|---|---|
| 0 254 501 | 1/1988 | European Pat. Off. . |
| 0 499 234 | 10/1991 | European Pat. Off. . |
| 0 562 651 | 9/1993 | European Pat. Off. . |
| 2 542 308 | 9/1984 | France . |
| 23 54 714 | 5/1975 | Germany . |
| 26 09 659 | 9/1976 | Germany . |
| 2940785 | 4/1981 | Germany ................................. 521/83 |
| 3108904 | 1/1982 | Germany ................................. 106/674 |
| 37 43 413 | 6/1989 | Germany . |
| 40 09 967 | 1/1991 | Germany . |
| 41 34 550 | 4/1993 | Germany . |
| 42 38 651 | 5/1994 | Germany . |
| 43 33 115 | 1/1995 | Germany . |
| 73 29616 | 9/1973 | Japan . |
| 48 075625 | 10/1973 | Japan . |
| 74 77928 | 7/1974 | Japan . |
| 74/69751 | 7/1974 | Japan . |
| 74 86415 | 8/1974 | Japan . |
| 114433 | 9/1975 | Japan ................................. 106/778 |
| 75 156533 | 12/1975 | Japan . |
| 76 07020 | 1/1976 | Japan . |
| 76 17216 | 2/1976 | Japan . |
| 76 34231 | 3/1976 | Japan . |
| 51 091930 | 8/1976 | Japan . |
| 77 16519 | 2/1977 | Japan . |
| 78 18626 | 2/1978 | Japan . |
| 37728 | 4/1978 | Japan ................................. 106/778 |
| 53 054228 | 5/1978 | Japan . |
| 79 119528 | 9/1979 | Japan . |
| 27961 | 2/1982 | Japan ................................. 106/680 |
| 59 018146 | 1/1984 | Japan . |
| 59 03058 | 1/1984 | Japan . |
| 59 18143 | 1/1984 | Japan . |
| 59 18144 | 1/1984 | Japan . |
| 59 18145 | 1/1984 | Japan . |
| 59 18146 | 1/1984 | Japan . |
| 54658 | 3/1984 | Japan ................................. 521/83 |
| 02/296780 | 12/1990 | Japan . |
| 5-105544 | 4/1993 | Japan . |
| 493 438 | 8/1970 | Switzerland . |
| 655 672 | 4/1979 | U.S.S.R. . |
| 0 299 484 | 10/1928 | United Kingdom . |
| 0 299 854 | 2/1930 | United Kingdom . |
| 1 049 184 | 11/1966 | United Kingdom . |
| 2 019 381 | 10/1979 | United Kingdom . |
| WO93/08142 | 4/1993 | WIPO . |

OTHER PUBLICATIONS

Research Disclosure 135:37 Ref. No. 13540 (Jul. 1975).
CLB Chem Labor Biotech. 41(2):79–80 (1990) Also cited as Chem Abs. 115:238433 and 112:164001.
Encyclopedia of Polymer Science & Engineering, vol. 17, 730–84 (1989).
Bekturov, E.A. & Bakauova, Z. Kh., Synthetic Water–soluble Polymers in solution, Huethig, Basel, 79–83 (1986).

*Primary Examiner*—Peter A. Szekely
*Attorney, Agent, or Firm*—Wayne C. Jaeschke; Stephen D. Harper; Daniel S. Ortiz

[57] ABSTRACT

A composition for producing light plaster contains as main constitutive elements particles of plaster in anhydride or hemihydrate form and at least one foaming agent. The composition is characterized in that the foaming agent generates gas after a delay of 1 minute to 24 hours and constitutes 0.1 to 50% by weight of the total dry mixture. Also disclosed is the use of said composition to produce in-situ cellular plastic and low density plaster moldings.

39 Claims, No Drawings

COMPOSITION FOR PRODUCING LIGHT PLASTER, PRODUCTION OF THE FOAMING AGENT USED THEREFOR AND ITS USE

This invention relates to a composition for the production of low-density gypsum ("light gypsum") which contains an blowing agent for the delayed evolution of gas. The present invention also relates to the production of the blowing agents used, to the use of the composition for the production of light gypsum parts or mouldings and for the production of assembly and insulating foam.

BACKGROUND OF THE INVENTION

Compositions for the production of light gypsum, which contain as key components particulate setting gypsum, more particularly in the form of anhydride and/or hemihydrate, and at least one blowing agent consisting of an acid in the form of a mineral acid or an organic acid and, as an additional component, a gas-forming salt, are already known. In the context of the present invention, gypsum in anhydride form is understood to be pure calcium sulfate with no water of hydration.

Thus, CA 119:78617, an abstract of JP-A-05105544, relates to a low-density gypsum product in which anhydrite, sulfates and calcium carbonate are contacted with one another, resulting in the formation of carbon dioxide gas bubbles.

CA 91:61734, an abstract of SU 77-2522229, relates to a low-density gypsum product in which gypsum hemihydrate is reacted with a sodium carbonate melt, sodium sulfate and water.

CA 89:48101, an abstract of JP-A-76-92941, relates to a low-density gypsum product in sheet form which is obtained by reacting gypsum hemihydrate together with calcium carbonate in the presence of dilute sulfuric acid and water.

CA 85:24916, an abstract of JP-A-74-107006, relates to a low-density gypsum product, in which a gypsum hemihydrate is reacted together with a powder-form alkali metal or alkaline earth metal carbonate in the presence of an aqueous solution additionally containing methyl cellulose. The foamed material thus produced has a density of 0.5 g/cm$^3$.

CA 84:168779 relates to a gypsum suspension containing calcined gypsum, calcium carbonate and a 40% hexafluorosilicic acid and, for the rest, water. A light gypsum with a density of 0.55 is obtained in this way.

CA 84:154766, an abstract of JP-A-74-77409, relates to a low-density gypsum product, in which a calcined gypsum is contacted with sodium stearate, calcium carbonate, dilute hydrofluoric acid and, for the rest, water and then reacted to form foamed mouldings. The light gypsum mouldings obtained in this way have a density of 0.61.

CA 84:154755, an abstract of JP-A-74-66659, relates to a low-density gypsum product, in which a mixture of 95% by weight calcium sulfate hemihydrate and 5% by weight calcium carbonate is reacted with a 3% sulfuric acid, fibrous material. The mouldings obtained have a specific gravity of less than 0.1.

CA 84:126033, an abstract of JP-A-74-64062, relates to a low-density gypsum product, in which calcined gypsum is reacted together with calcium stearate, calcium carbonate and a 40% aqueous hexafluorosilicic acid solution and water to obtain a molded product having a specific gravity of 0.47.

CA 82:47224, an abstract of JP-A-71-119764, relates to a low-density gypsum product, in which a calcined gypsum is reacted together with water, calcium carbonate, calcium fluorosilicate and barium stearate. A calcined gypsum product with a density of 0.57 g/cm$^3$ is obtained in this way.

CA 80:73793, an abstract of JP-A-72-5988, relates to a low-density building material, in which a carbonate or bicarbonate is reacted with a phosphoric acid partial ester at room temperature or above room temperature. Gypsum inter alia may be added to this mixture which, if heated to 50° C., leads to a foamed gypsum product with a density of 0.4 g/cm$^3$.

CA 122:272364, an abstract of German patent 43 33 115, relates to cement, concrete or a similar building material which is obtained by reacting a curable calcium sulfate together with an alkali metal bicarbonate, boric acid, calcium hydroxide and a foaming agent, a plasticizer and a retarding agent. The low-density gypsum products obtained in this way have a density of 1.3 g/cm$^3$.

CA 120:84826, an abstract of EP-A-562651, relates to a gypsum product with an apparent density of 0.5 to 1.5 g/cm$^3$ which is obtainable by reacting calcium sulfate, magnesium hexafluorosilicate, aluminium stearate, calcium carbonate and/or magnesium carbonate, methyl cellulose, sodium citrate and water.

Research Disclosure, Vol.135, July 1975, page 37, Disclosure No. 13540, relates to the production of low-density gypsum, in which gypsum hemihydrate is first suspended together with manganese dioxide and water and hydrogen peroxide is added to the resulting suspension for foaming. In addition, PVA emulsions may be added to this product to improve its properties.

CA 101:11552, an abstract of JP-A-82-124909, relates to a low-density gypsum product in which a gypsum hemihydrate is reacted with barium stearate, calcium carbonate, calcium oxide, an aqueous polyvinyl alcohol solution and water. Gypsum elements with a density of 0.76 are obtained in this way.

CA 101:11551, an abstract of JP-A-82-124910, relates to a low-density gypsum product, in which β-gypsum hemihydrate, calcium stearate, calcium carbonate, calcium oxide, polyvinyl alcohol and ammonium sulfate are reacted with hexafluorosilicic acid. The product thus obtained has a density of 0.78.

CA 101:11550, an abstract of JP-A-82-124908, relates to a gypsum product with a density above 0.76 obtained by reacting gypsum hemihydrate, hydrophobic stearates, carbonates or bicarbonates and basic oxides in the presence of acidic fluorides and water and synthetic resins.

CA 101:11549, an abstract of JP-A-82-124907, relates to a low-density gypsum product, i.e. a gypsum product with a density of about 0.78, obtained by reacting gypsum hemihydrate, hydrophobic stearates, carbonates or bicarbonates, basic oxides, emulsions of synthetic resins, water and acid fluorides, such as aqueous hexafluorosilicic acid.

CA 100:214666, an abstract of JP-82-112342, relates to a gypsum product with a density of about 0.78 obtainable by reacting gypsum hemihydrate, stearates, carbonates or bicarbonates, basic oxides, acidic fluorides, for example hexafluorosilicic acid, in the presence of polyvinyl alcohol.

CA 89:151558, an abstract of JP-A-76-128274, relates to a gypsum product with a density of 0.35 g/cm$^3$, in which a calcined gypsum, a fibrous material, a metal oxide and a stabilizer are contacted with water, a percarbonate is added and the mixture as a whole is then subjected to a heat treatment.

CA 87:89532, an abstract of JP-A-75-93352, relates to a low-density gypsum product in which an α-gypsum is stirred together with water and ammonium hydrogen carbonate is then added.

CA 80:86931, an abstract of JP-A-69-84902, relates to a gypsum product with a density of about 0.56 g/cm$^3$ obtainable by reacting a calcined gypsum suspension to which a concentrated aqueous formaldehyde solution, water and ammonium hydrogen carbonate are added.

CA 82:102462, an abstract of JP-A-72-347, relates to a low-density gypsum product obtainable by reacting synthetic gypsum and sodium hydrogen carbonate to which a 1% polyvinyl alcohol solution was added before heating for 1 hour to 80° C.

CA 81:175233, an abstract of JP-A-72-107634, relates to gypsum products with densities of 0.15 to 0.65 g/cm$^3$ obtainable by reacting a gypsum suspension together with a fatty acid salt, a foam stabilizer based on a fatty acid salt, calcium carbonate and aluminium sulfate.

CA 115:238433 and CA 112:164011 an abstract of an Article in CLC Chem. Labor. Biotech. (1990), 41 (2), pages 79–80, relates to an artificial building material, in which surfactants, barium carbonate and water are mixed and foamed and clay or inter alia gypsum is mixed with the resulting foam.

JP-A-901296780 relates to a low-density gypsum product or gypsum foam obtained by reacting a gypsum suspension with a sulfonate of a $C_{10-16}$ fatty acid alkyl ester as foaming agent.

DE-C-41 34 550 relates to a process for the production of in situ foam by reacting suspended gypsum with polyisocyanate prepolymers, in which 30 to 70% by weight of gypsum dihydrate and 30 to 30% of water, based on the slurries, are used as the suspended gypsum and 40 to 60% by weight of the gypsum dihydrate/water slurries and 60 to 40% by weight of standard diphenyl methane-4,4'-diisocyanate or diphenylmethane-4,2'-diisocyanate prepolymers with an NCO content of 2 to 20% by weight or 2,4-toluene diisocyanate or 2,6-toluene diisocyanate prepolymers with an NCO content of 2 to 20% by weight or a mixture of these compounds are introduced into the gap and left to cure at normal temperature and pressure. The in situ foam is produced in particular by means of a multicomponent unit, such as a spray can or spray gun. In the case of two-component systems, the aqueous component consists of a thixotropic hydrargillite/REA gypsum (REA gypsum=gypsum from flue glas desulfurizing plants) mixture with a solids content of at least 66% by weight using water-soluble, chemically modified celluloses as the thixotropicizing agent. The foam thus obtained can be machined after curing and is flame-retarded. WO 93/08142 is based on the same priority.

CA 92:63584p, an abstract of JP-A 79/119528, relates to a low-density gypsum product, in which a gypsum hemihydrate is foamed with a urethane prepolymer and water, optionally in the presence of fillers, and allowed to cure. A flame-retardant gypsum product with a specific gravity of 0.52 is obtained in this way.

In view of the steadily intensifying environmental debate, there is a high demand for more environmentally compatible insulating materials and low-density gypsum parts and gypsum mouldings.

Modern one-component and two-component polyurethane foams, which are used in containers, such as cans, or with mixing units, inter alia for heat insulation, harm the environment with some of their ingredients, for example the Frigen® used as blowing agent, i.e. fluorochlorocarbons, partly halogenated fluorochlorocarbons, fluorocarbons (CFCs, HCFCs, FCs), and continue to harm the environment through halogen-containing flameproofing agents.

All the above-mentioned compositions for the production of low-density gypsum have disadvantages insofar as, in the case of polyurethane-free systems, foaming by gas generation takes place immediately after addition of the gas-generating component, i.e. the pot life or induction time (=time before the increase in volume) of such systems is of the order of 1 to 10 seconds which makes systems of the type in question difficult to handle in practice for direct "in situ mixing". However, even with systems containing polyisocyanates, which normally have pot lives or induction times of 5 to 60 seconds in the case of pure PU foams, this period of time is generally not sufficient to enable such a known composition to be introduced before foaming into complicated spaces where it is used as a in-situ foam (cf. Franck, Kunststoff-Kompendium, 1st Edition, Würzburg 1984, page 211). Even the rise time (=time from the beginning of mixing to the end of expansion) of pure PUR foams is only 55 to 270 seconds and, accordingly, in complicated and large spaces, can never lead to a light gypsum which is uniformly foamed—a crucial requirement, for example, for good insulating properties.

DETAILED DESCRIPTION OF THE INVENTION

The problem addressed by the present invention was to provide an improved composition for the production of light gypsum which contains setting, particulate gypsum in the form of anhydride and/or hemihydrate and at least one blowing agent as key constituents and which, under in-use conditions, i.e. in the presence of water, has a pot life or induction time which can be adjusted according to a time to be individually adapted according to the particular application envisaged and which, in most cases, is longer than the pot lives of known compositions for the production of light gypsum.

According to the invention, the solution to this problem is characterized in that a special blowing agent with a long induction time is used in a special concentration.

Accordingly, the present invention relates to a composition for the production of light gypsum which contains setting, particulate gypsum in the form of anhydride and/or hemihydrate and at least one blowing agent as key constituents, characterized in that the blowing agent generates gas with delay 1 minute to 24 hours after mixing with water.

The blowing agent preferably generates gas in 1.5 to 60 minutes and, more preferably, in 3 minutes to 30 minutes.

In one preferred embodiment, the composition for producing light gypsum contains 0.1 to 50% by weight and preferably 1 to 20% by weight of at least one blowing agent for the delayed generation of gas.

A blowing agent in the context of the invention is a substance with which a blowing gas can be generated after addition of water to the particulate, setting gypsum. The blowing agent added causes the mixture of setting gypsum and water to expand.

Setting, particulate gypsum in the context of the present invention is understood to include bead gypsum, stick gypsum of randomly formed gypsum which may be present both in powder form and in the form of microbeads with diameters of typically from 1 μm to 1 cm and preferably from 2 μm to 1 mm.

The blowing agent for the delayed generation of gas preferably consists of at least two components of which at least one is provided with a water-permeable, preferably film-forming coating. In the blowing agent of two added components, both components may of course also be coated.

Alternatively, the composition may also be formulated in such a way that the blowing agent for the delayed generation of gas consists of one component which is provided with a water-permeable, preferably film-forming coating.

The above-mentioned water-permeable, preferably film-forming coating contains at least one water-swellable, water-dispersible or water-soluble, naturally occurring substance, at least one synthetically modified, naturally occurring, enzymatically decomposable substance or at least one synthetic substance.

The above-mentioned substance may be both an inorganic substance and an organic substance. Examples of inorganic substances include soda or potash waterglass, polyphosphates, magnesium sulfate and calcium sulfate and other substances with only a small solubility product.

Where the water-permeable, preferably film-forming coating used in accordance with the invention is a naturally occurring polymer, it contains polysaccharides, lignin, natural rubber, proteins and/or natural resins, for example colophony-based natural resins.

Where polysaccharide-based polymers are used as the coating material in the compositions according to the invention, they contain film-forming materials obtained from terrestrial plants, from marine plants or from microorganisms.

Thickeners based on polysaccharides from terrestrial plants are understood above all to be starch and starch products, i.e. for example corn starch, wheat starch and rice starch and also potato starch and tapioca starch. Starch products in the context of the invention are understood to be physically modified starch products which, in contrast to native starch, neither have to be boiled before use to obtain the thickening effect nor form opaque and unstable solutions which turn into a jelly or throw a deposit on standing. Starches of the type in question produced by physical modification and/or enzymatic degradation are obtained in the form of pregelatinized starches, above all by pregelatinization and subsequent drying, so-called roller drying or spray drying. Other polysaccharides obtained from terrestrial plants are the galactomannans, for example carob bean flour and guar gum. Other polysaccharides obtained from terrestrial plants are the so-called pectins or pectinous substances which include orange pectin, grapefruit pectin, lemon pectin and apple pectin according to the starting material. Other clear differences will be apparent according to whether the product used has a high degree of esterification or a low degree of esterification. Instead of pectin itself, the principal constituent of pectin, namely polygalacturonic acid, may also be used. Another polysaccharide obtained from terrestrial plants is an exudate gum, for example gum arabic or acacia gum and tragacanth. Other polysaccharides obtained from terrestrial plants are cellulose derivatives such as, for example, O-carboxymethyl cellulose (CMC) and O-methyl cellulose. Other polysaccharides obtained from terrestrial plants are derived from quince seed mucilage and linseed mucilage, cherry gum, salepmannan, larch gum, lichenin from Irish moss, tamarind seed flour, conjaku flour and tara gum.

The polysaccharides obtained from marine plants, which may be used for a coating forming a layer removable by water, are understood above all to be alginates, i.e. polysaccharides obtained from the cell walls of various brown algae. Other polysaccharides obtained from marine plants are agars which are obtained from the cell walls of red algae of the species Gelidium and Gracilaria and which represent mixtures of the gelling agarose and the non-gelling agropectin. Other polysaccharides obtained from marine plants are the carrageenans obtained by extraction of certain red algae. Finally, other polysaccharides obtained from marine plants are various other algal polysaccharides of which the most well known is Danish agar.

Another group of polysaccharides which may be used as the film-forming coating material are thickeners obtained from microorganisms, for example the dextran formed by Leuconostoc mesenteroides and the xanthan formed by Xanthomonas campestris.

Normally, protein-based thickeners are essentially gelatins which are available in various qualities. Depending on the production process used, gelatin is divided above all into type A, which is obtained by the acidic digestion of collagen, and type B which is produced by a corresponding alkaline digestion process.

Synthetically modified, naturally occurring polymers are understood in particular to be modified polysaccharides and, above all, the corresponding cellulose ethers, cellulose esters, starch esters or starch ethers or a mixture thereof. Examples of cellulose ethers are methyl cellulose, hydroxymethyl cellulose, hydroxymethylhydroxyethyl cellulose, hydroxypropyl cellulose, hydroxypropylmethyl cellulose, hydroxyethylmethyl cellulose, hydroxyethyl cellulose, cyanoethyl cellulose, ethyl cellulose, carboxymethyl cellulose or a mixture of the above-mentioned cellulose ethers.

Examples of cellulose esters are cellulose acetate, cellulose acetobutyrate, cellulose acetopropionate, cellulose propionate or a mixture of these cellulose esters. Examples of starch esters are starch nitrate, starch phosphate, starch xanthogenate, starch acetate, starch sulfate, starch citrate or a mixture of these starch esters. Examples of starch ethers are starch carboxymethyl ether, hydroxyethyl starch, hydroxypropyl starch, cationic starches and mixtures of the above-mentioned starch ethers.

Enzymatically decomposable substances in the context of the present invention are understood in particular to be organic substances which are degraded by microorganisms. Examples of such organic substances include the above-mentioned polysaccharides and modified polysaccharides.

Synthetic polymers which may be used as a film-forming coating material removable by water include polymers selected from polyvinyl compounds, preferably polyvinyl alcohol, polyvinyl pyrrolidone, polyvinyl acetate/crotonic acid copolymers, polymaleic anhydride and copolymers thereof, polyvinyl butyral; from polyacrylic compounds, preferably poly(meth)-acrylic acid ester copolymers; poly-2-ethyl oxazoline and polyacrylamides. In addition, polyethylene oxides with molecular weights of 100,000 to 5,000,000 may also be used as the synthetic, permeable film-forming coating materials. Finally, the synthetic polymers removable by water also include polyelectrolytes, such as anionic polyelectrolytes, for example poly(acrylic acid) and salts thereof, poly(methacrylic acid) and salts thereof, poly (vinylsulfonic acid) and salts thereof, poly(styrene sulfonic acid) and salts thereof, 2-methacryloyloxyethane sulfonate (SEM), 3-methacryloyloxy-2-hydroxypropane sulfonic acid (SHPM), 2-acrylamido-2-methyl propane sulfonic acid (AMPS), sodium-3-acrylamido-3-methyl butanoate, sodium-3-methacrylamido-3-methyl butanoate, poly(vinyl phosphonic acid) salts, poly(maleic) acid, poly(4-vinylbenzoic acid) salts, poly(3-vinyloxypropane-1-sulfonic acid) salts, poly(4-vinylphenol) salts and poly(N-vinyl succinic acid imide) acid. Polyelectrolytes of the type in question are also understood to include cationic polyelectrolytes, for example cations based on polyacrylamide, diallyl dimethyl ammonium chloride, diallyl diethyl ammonium chloride, diethyl aminoethyl methacrylate, dimethyl aminoethyl methacrylate, methacryloyloxyethyl trimethyl ammonium sulfate, methacryloyloxyethyl dimethyl ammonium chloride and 3-(methacrylamido)-propyl trimethyl ammonium chloride. An overview of these water-soluble polymers suitable for use in accordance with the invention can be found in Encyclopedia of Polymer Science and Engineering, Vol. 17 (1989), pages 730 to 784. Polyurethane dispersions (cationic, anionic and nonionic) may also be used.

Another group of water-permeable polymers are, for example, polyethylene glycols with molecular weights of more than 600 g/mole. In their case, the blowing agent(s) may be coated by grinding of the component(s) together with the polyethylene glycol, the polymer being applied to the surface of the blowing agent.

Other water-permeable, preferably film-forming polymers are polypropylene glycol, poly(1,2-) dimethoxyethylene, poly(methyl vinyl ether), poly(4(5) vinyl imidazole), poly(vinyl-4-chlorobenzoate). Also suitable are the ionenes, i.e. strong polybases with tertiary nitrogen in the main chain which are described, for example, in the book by E. A. Bekturov and Z. Kh. Bakauova entitled "Synthetic Water-soluble Polymers in Solution" Hüthig, Basel, 1986, pages 79 to 83. Other water-soluble polymers which may be used in accordance with the invention to produce a film-forming coating can be found in this book. It is of course also possible to use monomer mixtures for the polymerization and to employ mixtures of various polymers.

The water-permeable, preferably film-forming polymer coating mentioned above is normally applied to at least one of the two components of the blowing agent by a coating process. Suitable coating processes are generally known to the expert and may be carried out, for example, in typical coating machines such as, for example, coating pans, tumblers, fluidized beds or bead coaters. A review of coating techniques as used in food technology was published, for example, in an Article in the company journal of Haarmann und Reimer entitled "Contakt", No. 57, pages 4–8 and No. 58, pages 3–7. It is apparent from this literature reference that the solutions employed for coating are typically used in quantities of about 10 to 40%. Where synthetic polymers are used, 5 to 80% by weight solutions are normally employed.

In one preferred embodiment of the present invention, a blowing agent which generates carbon dioxide gas, oxygen gas, hydrogen gas, dinitrogen oxide gas, a noble gas or nitrogen gas with delay is used in the composition for producing light gypsum.

If the blowing agent mentioned above is required to generate a noble gas, noble gases, for example argon in inclusion compounds, are used for this purpose. One example is hydroquinone which forms cage lattices in which not only noble gases, but also oxygen is accommodated. Inclusion compounds such as these can be constructed in such a way that gas is released from them with delay.

In one preferred alternative embodiment of the present invention, the composition for producing light gypsum contains an acidic organic or inorganic solid component provided with a water-permeable, preferably film-forming coating as the blowing agent and the particulate gypsum is a gypsum which contains at least 1 mg of carbonate per gram of gypsum.

Carbonate-containing gypsums of the type in question either occur in nature, as for example natural anhydrite in the form of the rocks trias and colpa, which have a total percentage content of calcium carbonate and magnesium carbonate of 2.5%, or flue gas gypsum with a calcium carbonate content of 1% by weight, or may be made with a carbonate content by addition of carbonate. An overview of gypsum as a natural raw material and as a residual material of industrial processes was published in "Chemie in unserer Zeit", Vol. 17, 1985, No. 4, pages 137 to 143. The carbonate content can vary from 0 to at most 5%, depending on how the rocks are crushed.

In another preferred embodiment, the composition according to the invention consists of an blowing agent with at least two components of which at least one component contains an acidic organic solid component selected from organic acids or phenols or an inorganic solid component selected from acids or acidic salts of this compound optionally provided with a water-permeable preferably film-forming coating.

In another preferred embodiment, the composition according to the invention contains a component of the blowing agent which contains a gas-generating solid component selected from metal powders such as, for example, magnesium powder, aluminium powder, azo compounds, carbonates, hydrogen carbonates, sesquicarbonates, peroxides, perborates, percarbonates, azides or hydrides which is optionally provided with a water-soluble, film-forming coating. If the blowing agent in the composition according to the invention contains two components, the solid acidic component preferably has a water-soluble coating. The acidic component of the blowing agent preferably contains an organic acid which is preferably selected from hydroxycarboxylic acids, such as citric acid, tartaric acid or malic acid, ascorbic acid or glucose acid, dimethylol propionic acid, etc. or mixtures thereof.

The gas-generating blowing agents mentioned above are preferably solid compounds which generate carbon dioxide gas or an oxygen gas selected from carbonates, hydrogen carbonates, sesquicarbonates, peroxides, perborates and percarbonates of mono- to tetravalent cations, more particularly alkali metals and alkaline earth metals, more especially sodium, potassium, magnesium, calcium or barium.

If a blowing agent which generates gas with delay is not the only important aspect of the composition according to the invention, i.e. if a light gypsum of high strength and high homogeneity is also to be obtained, the composition must also contain—based on the dry mixture as a whole—from 0.5 to 50% by weight of at least one water-soluble, water-dispersible or water-dispersed polymer. The polymer in question may be, for example, a redispersion powder or a polymer dispersion which is added during mixing with water or instead of water. Any dispersions which form a stable mixture with gypsum over the corresponding processing time (for example acrylate, vinyl acetate, urethane, amide dispersions, copolymers and mixtures) are suitable for this purpose. The polymer in question may also be an oleochemical polymer, for example a reaction product of a soybean oil epoxide with ethylenediamine having an average molecular weight of about 30,000 g/mole. The polymer may also be a water-soluble, preferably film-forming organic polymer of the type defined above.

The redispersion powder is preferably a vinyl acetate or a vinyl acetate copolymer, for example an ethylene/vinyl acetate. The redispersion powder may also be a water-soluble, water-dispersible or water-dispersed polymer based on acrylate or an acrylate copolymer, for example styrene/ acrylate or styrene/butadiene/acrylate. Natural rubber, polychloroprene, polyurethane and polyamide is also suitable for this purpose. According to the invention, a mixture of the polymers mentioned above may also be used as a cohesion agent.

In the composition according to the invention, the principal component is a gypsum in the form of the anhydride or hemihydrate in all the chemical modifications occurring ($\alpha$- and $\beta$-hemihydrate, anhydrite I, II, III) based on natural gypsum and synthetic gypsum. In principle, these hydraulically setting versions based on $CaSO_4$ may be present both in pure form and in the form of mixtures.

A $\beta$-gypsum of the type obtained by the rotary calciner process or by the kettle process is normally used as the natural gypsum. A corresponding multiphase gypsum may be obtained by the travelling grate process while an $\alpha$-gypsum may be obtained by the autoclave process.

In the case of the gypsums used in the form of synthetic gypsums, the $\beta$-gypsum is obtained by the Knauf rotary calciner process, the Knauf kettle process and by the kettle process without recrystallization. A corresponding multiphase gypsum may be obtained as synthetic gypsum by the Knauf aggregate process while an $\alpha$-gypsum may be obtained by the Giulini autoclave process.

Today, however, a large proportion of gypsum comes from the desulfurization of flue gases where it is produced in the Bischoff process, in the Saarberg-Hölter process and in the Bergbau-Forschung (Mining Research) process, around 2 million tonnes of so-called residue gypsum having been produced for example in 1990. The $\alpha$-hemihydrate from REA gypsum above all has acquired particular significance. This low-carbonate gypsum is used, for example, when the acidic blowing agent component or both components required for the blowing gas (added carbonate and acidic component) are present in coated form.

In the compositions according to the invention, gypsum of the provenances mentioned above is present as the main product in quantities of 20 to 99.9% by weight and preferably 50 to 98% by weight, based on the inorganic binder component of the dry mixture.

Other constituents of the gypsum-containing compositions according to the invention are, for example, typical fillers, auxiliaries and additives which vary according to the application envisaged.

The fillers are, above all, mineral and/or inorganic fillers such as, for example, clays, sand, gravel, cement, slag, glass, silica gels, sulfates (for example calcium sulfate dihydrate), oxides (for example magnesium oxide, calcium oxide), glass and mineral fibers, manmade fibers, hollow microbeads, organic light fillers (for example polystyrene foam), granules (fined) from recycling plants, paper powder, starch powder, wood chips and sawdust, cellulose fibers, etc. Preservatives, rustproofing agents, dyes and flame retardants, for example Vermiculite, aluminium or magnesium hydroxide or organic flame retardants, may also be used as additives.

Other constituents of the gypsum composition according to the invention are substances with a wetting effect which reduce the water demand and are normally known as wetting agents. Examples are alkylaryl sulfonates, salts of lignin sulfonic acid or melamine resins. An overview of wetting agents can be found, for example, in an Article in "Zement, Kalk, Gips", Vol. 21, pages 415 to 419 (1968). These wetting agents are normally added to the composition according to the invention in quantities of 0 to 10% and, through the relatively low water content, often reduce the late drying time of the set gypsum formulations.

The water demand can also be increased by addition of flocculating agents, for example polyethylene oxides of the type described, for example, in GB-A-1,049,184. These auxiliaries may be added in quantities of 0 to 10% by weight, based on the dry mixture.

The stabilization of a water/gypsum slurry to prevent sedimentation or separation is achieved by adding chemicals with a thickening effect, for example cellulose and starch ethers. These thickeners have hardly any effect on the water demand. They are added to the dry mixture according to the invention in quantities of 0 to 5% by weight, based on the dry mixture. As already mentioned, polymer dispersions may also be added to the gypsum during mixing in order in particular to improve elasticity and adhesion.

The compositions according to the invention may also contain auxiliaries which act as accelerators. These accelerators may be selected in particular from various inorganic acids and salts thereof, more particularly sulfuric acid and salts thereof. A special position in this regard is occupied by calcium sulfate dihydrate which, in fine distribution, has a pronounced accelerating effect and, accordingly, has to be completely removed in the calcination of crude gypsum. The accelerating effect of these substances is mostly attributable to an increase in the solubility and dissolving rate of the calcined gypsum and to an increase in the nucleation rate.

Other auxiliaries in the gypsum-containing composition according to the invention are known retarders which slow down the stiffening and hardening process. They include, above all, organic acids and salts thereof and organic colloids which are also formed, for example, as degradation products in the hydrolysis of high molecular weight naturally occurring substances, for example proteins, and also salts of phosphoric acid or boric acid. Dextrins and hisbiscus roots are also suitable. There are various retarding mechanisms. Relatively high molecular weight colloids prolong the induction period because they are nucleus poisons. Other retarders slow down the dissolving rate of the hemihydrate and the growth of the dihydrate crystals. Retarding anhydride II is generally of no practical interest because it already changes into dihydrate sufficiently slowly and is generally accelerated. Based on the dry mixture, this particular component may make up from 0 to 5% by weight of the gypsum compositions according to the invention.

As known to the expert, the quantity of water used required upon the type of gypsum starting material used, i.e. to obtain a free-flowing slurry of the same consistency, a rotary calciner $\beta$-gypsum needs more water than a kettle gypsum which in turn needs more water than a multiphase gypsum which, for its part, needs more water than an autoclave gypsum. In addition, the quantity of water has a critical bearing both on the density and on the strength of the gypsum product formed. Without requiring any special measures, $\alpha$-gypsums which can be molded with quite small amounts of water give gypsum products of high density and high strength which, on account of their unwanted brittleness, are avoided for many applications in the building industry. $\beta$-Gypsums and multiphase gypsums need more water than $\alpha$-gypsums for a free-flowing consistency. Accordingly, they give gypsum products combining average strength and relatively high elasticity with relatively low densities which are widely used in the building industry.

The present invention also relates to a composition of the above-mentioned type which, besides particulate gypsum in the form of anhydride and/or hemihydrate and gas-generating agent, also contains 0 to 45% of fillers (and fibers, light fillers, etc.),
0 to 2% of a wetting agent,
0 to 5% of a wetting agent,
0 to 5% of an accelerator,
0 to 5% of a retarder,
0 to 5% of a hydrophobicizing agent,
0 to 5% of a plasticizer,
based in each case on the mixture as a whole.

In one preferred embodiment, the hydrophobicizing agent present in the composition according to the invention is a polysiloxane, a wax (in pure form, dispersed or adsorbed onto a support material) or an oleochemical additive (which may act both as a hydrophobicizing agent and as a polymer strengthener), the oleochemical additive being selected from at least one at least $C_8$ fatty compound containing at least one carboxyl group and having a molecular weight of 143 to 20,000 and/or a salt thereof, at least one at least $C_8$ fatty compound containing at least one hydroxyl group and having a molecular weight of 130 to 20,000, at least one fatty compound containing at least one ester group and having a molecular weight of 158 to 20,000, the acid component and/or the alcohol component containing at least 8 carbon atoms, at least one fatty compound containing at least one ether group and having a molecular weight of 144 to 20,000, at least one of the two ether groups containing at least 8 carbon atoms, at least one fatty compound containing at least one amino group or one quaternary ammonium salt and having a molecular weight of 129 to 20,000, at least one of the three or four groups arranged around the nitrogen atom containing at least 8 carbon atoms, at least one fatty compound containing at least one amide group and having a molecular weight of 157 to 20,000, the acid component of the amide containing at least 8 carbon atoms, at least one at least $C_8$ fatty compound containing at least one epoxide group and having a molecular weight of 128 to 20,000, at least one at least $C_8$ fatty compound containing at least one anhydride group and having a molecular weight of 210 to 20,000, at least one at least $C_8$ organophosphorus fatty compound having a molecular weight of 193 to 20,000, at least one at least $C_8$ organoboron fatty compound having a molecular weight of 174 to 20,000, at least one at least $C_8$ organosulfur fatty compound having a molecular weight of 164 to 20,000 and at least one at least $C_8$ fatty compound containing at least one urethane group and having a molecular weight of 213 to 20,000.

The present invention also relates to a process for the production of the retarded gas-generating blowing agent mentioned above which is characterized in that either an acidic component or a gas-generating component or both components separately from one another is/are contacted with a water-containing dispersion or solution, which contains at least one water-permeable, naturally occurring substance, at least one synthetically modified naturally occurring substance, at least one enzymatically degradable or synthetic substance or at least one polymer of the type described above, for a time sufficient for the film-forming coating to form and any excess solvent is removed. The film-forming coating is normally produced by a coating process known to the expert, for example by fluidized bed coating, by tumbler coating, by pan coating or by coating in a bead coater.

Alternatively, the retarded gas-generating blowing agent which may be used in the compositions according to the invention may also be produced by contacting the acidic component and/or the gas-generating component with a dispersion or solution containing a non-aqueous solvent, which contains or consists of at least one water-permeable, naturally occurring substance, at least one synthetically modified naturally occurring substance or synthetic substance or at least one polymer of the type mentioned above, for a time sufficient for the preferably film-forming coating to form and removing any excess solvent.

Non-aqueous solvents in the context of the present invention are understood to be organic solvents which are inert both to the acidic component and to the gas-generating component so that no premature gas generation can occur. Examples of such organic solvents are substantially water-free hydrophilic solvents for the polymers, particularly synthetic polymers, mentioned above.

In another alternative embodiment, the components may also be coated by using as the water-permeable, preferably film-forming coating a substance of wax-like consistency which, in the event of contacting, for example by grinding, applies both to the acidic component and to the gas-generating component a coating which is permeable to water with delay and, accordingly, is capable of generating gas with delay.

In another preferred embodiment, the problem addressed by the present invention was to use the above-mentioned composition in a pack in which the particulate, setting gypsum, the blowing agent(s) and the auxiliaries and additives are present together, the volume of the pack being selected so that a water-containing liquid can be added at least in a quantity sufficient for setting.

Another problem addressed by the present invention was to enable the compositions according to the invention to be used for the production of in-situ foam or gap-filling foam. Foams of this type are foams which are produced at the point of use, i.e. in situ. In-situ foams are preferably used as assembly foams, for filling voids and as insulating foams both indoors and outdoors. Foams of the type in question may also be used with particular advantage for applications where the applied but as yet non-foamed mixture has to be prevented from flowing under the effect of gravity, for example between door frames or window frames and masonry. Another potential application is the filling of empty spaces, for example in mines for consolidating loose rock, for the heat insulation and sound insulation of domestic appliances, containers, roofs and molds of complex geometry, in the petroleum industry and for the rapid and relatively simple construction of emergency accommodation. The compositions according to the invention are also suitable for the production of assembly adhesives and modeling compounds.

Another problem addressed by the present invention was to enable the compositions according to the invention to be used for the production of low-density gypsum products, i.e. gypsum products with a density of 0.05 to 1.5 g/cm$^3$ and preferably 0.1 to 1.0 g/cm$^3$.

Such products are, on the one hand, the so-called prefabricated rigid-foam gypsum moldings which are widely used in the building industry in the form of sandwich type gypsum plasterboards, gypsum wallboards, heat insulation boards, gypsum partition blocks and gypsum ceiling boards. A relevant overview can be found in Ullmann's Encyklopädie der technischen Chemie, Vol. 12, page 307 (1976). The gypsum-containing compositions according to the invention may also be used in the form of gypsum plaster, more particularly insulating plaster.

The invention is illustrated by the following Examples in which the blowing agent is shown by way of example as a system generating carbon dioxide gas with delay.

EXAMPLES

Production Example 1
(Two-component blowing agent, one component coated)
A1. Coated blowing agent component:
  50 g of dimethylol propionic acid are mixed while stirring with a methyl cellulose solution of 10 g in 200 ml of water and the water is removed in vacuo in a rotary evaporator. A free-flowing powder is obtained after cooling.
B1. Uncoated blowing agent component: calcium carbonate, technical, for example Calcilith 16B, a product of Alpha-Calcit Application Example 1
(Two-component blowing agent, carbonate-free gypsum hemihydrate and water)
  A composition for the production of light gypsum was produced by mixing 3 g of A1, 11.5 g of B1 and 50 g of gypsum (calcium sulfate hemihydrate) of the Alfor type (manufacturer: Börgardts-Sachsenstein, density 2.63, bulk density 900 g/l). This composition was named G1.
  64.5 g of G1 were introduced into 30 ml of water with vigorous stirring and poured into a casting mold over a period of up to 1 minute. The generation of gas and foaming to a volume of around 300% began after about 2 minutes and was over after about 5 minutes; the curing process itself was over after about 60 minutes.
  The dried gypsum foam had a density of 0.5 g/ml.

Application Example 2
(Two-component blowing agent, carbonate-free gypsum hemihydrate, water-dispersible polymer and water)
  Application Example 1 was varied by adding 5 g of a dimensionally stabilizing polymer in the form of polyvinyl acetate redispersion powder (Elotex® HM-110, a product of Elotex AG, Switzerland) to 100 g of composition G1. This mixture was named G2.
  69.5 g of G2 were introduced into 33 ml of water with vigorous stirring and poured into a casting mold over a period of up to 1 minute. The generation of gas and foaming to a volume of around 260% began after about 2 minutes and was over after about 5 minutes; the curing process itself was over after about 50 minutes. The added polymer considerably improved the strength of the foamed gypsum product in relation to Application Example 1. The density of the air-dry gypsum molding was 0.56 g/ml.

Production Example 2
(One-component blowing agent, coated)
  A coated dimethylol propionic acid was produced in the same way as in Production Example 1, except that the methyl cellulose was replaced by the same quantity of polyvinyl alcohol as the water-soluble polymer.

Application Example 3
(One-component blowing agent, coated; carbonate-containing gypsum hemihydrate; water)
  A composition for the production of light gypsum was produced by mixing 3 g of A1 and 60 g of gypsum (calcium sulfate hemihydrate, carbonate-containing) of the Alfor type (manufacturer: Börgardts, carbonate content 3%, density 2.63, bulk density ca. 900 g/l). This composition was named G3.
  63 g of G3 were introduced into 30 ml of water with vigorous stirring and poured into a casting mold over a period of up to 1 minute. The generation of gas and foaming to a volume of about 150% began after about 2 minutes and was over after about 4 minutes; the curing process itself was over after about 60 minutes.
  The dry gypsum molding had a density of about 1.1 g/ml.

Production Example 3
(Two-component blowing agent, both components coated at the same time)
AB2. 30 g of dimethylol propionic acid and 100 g of calcium carbonate were ground together with 10 g of PEG 6000 for 1 hour in a 1000 ml ball mill. A free-flowing powder was obtained.

Application Example 4
(Two-component blowing agent with delayed gas generation, gypsum hemihydrate, water)
  A composition for the production of light gypsum was produced by mixing 13 g of a AB2 and 50 g of gypsum (calcium sulfate hemihydrate) of the Alfor type according to Application Example 1. This composition was named G4.
  63 g of G4 were introduced with vigorous stirring into 30 ml of water at 20° C. and poured into a casting mold over a period of up to 1 minute. The generation of gas and foaming to a volume of around 270% began after about 1.5 minutes and was over after about 3 minutes; the curing process itself was over after about 60 minutes. The air-dry molding had a density of 0.55 g/ml.

What is claimed is:

1. A composition for the production of light gypsum, which comprises: particulate, setting gypsum selected from the group consisting of anhydride gypsum, hemihydrate gypsum and mixtures thereof and at least one blowing agent, coated with a water permeable coating of a film forming polymer selected from the group consisting of synthetic polymers, synthetically modified naturally occurring polymers and mixtures thereof, wherein the blowing agent generates carbon dioxide gas with a delay of from about 1 minute to about 60 minutes.

2. The composition as claimed in claim 1, wherein said composition comprises about 0.1 to about 50% by weight, based on the dry mixture as a whole, of the at least one blowing agent for the delayed generation of gas.

3. The composition as claimed in claim 1, wherein said composition comprises about 1 to about 20% by weight, based on the dry mixture as a whole, of the at least one blowing agent for the delayed generation of gas.

4. The composition as claimed in claim 1, wherein the blowing agent for the delayed generation of gas comprises at least two components of which at least one is provided with the water-permeable coating.

5. The composition as claimed in claim 1, wherein the water-permeable coating further comprises an inorganic substance.

6. The composition as claimed in claim 1, wherein the synthetically modified, naturally occurring polymer is a synthetically modified polysaccharide.

7. A composition as claimed in claim 6, wherein the synthetically modified polysaccharide is selected from the group consisting of cellulose ethers, cellulose esters, starch esters, starch ethers and mixtures thereof.

8. The composition as claimed in claim 7, wherein the cellulose ether is selected from the group consisting of methyl cellulose, hydroxymethyl cellulose, carboxymethylhydroxyethyl cellulose, hydroxypropyl cellulose, hydroxypropylmethyl cellulose, hydroxyethylmethyl cellulose, hydroxyethyl cellulose, cyanoethyl cellulose, ethyl cellulose, carboxymethyl cellulose and mixtures thereof.

9. The composition as claimed in claim 7, wherein the cellulose ester is selected from the group consisting of cellulose acetate, cellulose acetobutyrate, cellulose acetopropionate, cellulose propionate and mixtures thereof.

10. The composition as claimed in claim 7, wherein the starch ester is selected from the group consisting of starch nitrate, starch phosphate, starch xanthogenate, starch acetate, starch sulfate, starch citrate and mixtures thereof.

11. The composition as claimed in claim 7, wherein the starch ether is selected from the group consisting of starch carboxymethyl ether, hydroxyethyl starch, hydroxypropyl starch, cationic starch and a mixture of these starch ethers.

12. The composition as claimed in claim 1, wherein the synthetic polymer is selected from the group consisting of polyvinyl compounds, polyacrylic compounds, polyurethane, polyelectrolytes and mixtures thereof.

13. The composition as claimed in claim 12, wherein the polyvinyl compound is selected from the group consisting of polyvinyl alcohol, polyvinyl pyrrolidone, polyvinyl acetate/crotonic acid copolymers, polyvinyl butyral and mixtures thereof.

14. The composition as claimed in claim 12, wherein the polyacrylic compound is selected from the group consisting of poly(meth)acrylate copolymers, polyacrylamides and mixtures thereof.

15. The composition as claimed in claim 1, wherein the blowing agent comprises an acidic organic or inorganic solid component and the particulate gypsum is a gypsum which comprises at least about 1 mg of carbonate per g of gypsum.

16. The composition as claimed in claim 1, wherein the blowing agent comprises a solid acid selected from the group consisting of solid organic acids, solid phenols, inorganic solid acids, inorganic solid acidic salts and mixtures thereof.

17. The composition as claimed in claim 1, wherein the blowing agent comprises a gas-generating solid component selected from the group consisting of metal powders, azo compounds, carbonates, hydrogen carbonates, sesquicarbonates, peroxides, perborates, percarbonates, azides, hydrides and mixtures thereof.

18. The composition as claimed in claim 1, wherein the blowing agent comprises two components, wherein an acidic solid component has a water-permeable coating.

19. The composition as claimed in claim 1, wherein the blowing agent comprises an organic acidic component.

20. The composition as claimed in claim 19, wherein the organic acid component comprises hydroxycarboxylic acids.

21. The composition as claimed in claim 20, wherein the hydroxycarboxylic acid is selected from the group consisting of citric acid, tartaric acid, malic acid, ascorbic acid, glucose acid, dimethylol propionic acid and mixtures thereof.

22. The composition as claimed in claim 1, wherein, based on the dry mixture as a whole, said mixture further comprises about 0.5 to about 20% by weight of at least one water-soluble, water-dispersible or water-dispersed polymer.

23. The composition as claimed in claim 22, wherein the polymer is an, oleochemical polymer.

24. The composition as claimed in claim 22, wherein the water-soluble, water-dispersible or water-dispersed polymer is selected from the group consisting of vinyl acetate polymer, vinyl acetate copolymer, acrylate polymer, acrylate copolymer, natural rubber, polychloroprene, polyurethane, polyamide and mixtures thereof.

25. A composition as claimed in claim 1, wherein the particulate, setting gypsum is present in quantities of about 20 to about 99.9% by weight, based on the mixture as a whole.

26. A composition as claimed in claim 1, wherein the particulate, setting gypsum is present in quantities of more than about 50% by weight, based on the mixture as a whole.

27. The composition as claimed in claim 1, wherein said composition further comprises additives seleceted from the group consisting of:

0 to about 45% of carbonate-free fillers;

0 to about 2% of a surface-active agent;

0 to about 5% of a wetting agent;

0 to about 5% of an accelerator;

0 to about 5% of a retarder;

0 to about 5% of a hydrophobicizing agent;

0 to about 5% of a plasticizer; and mixtures thereof, based in each case on the mixture as a whole.

28. The composition as claimed in claim 27, wherein the hydrophobicizing agent is a polysiloxane, a wax or an oleochemical additive, the oleochemical additive being selected from the gruop consisting of:

at least about $C_8$ fatty compounds containing at least one carboxyl group and having a molecular weight of about 143 to about 20,000 and/or a salt thereof;

at least about $C_8$ fatty compounds containing at least one hydroxyl group and having a molecular weight of about 130 to about 20,000;

fatty compounds containing at least one ester group and having a molecular weight of about 158 to about 20,000, the acid component and/or the alcohol component containing at least about 8 carbon atoms;

fatty compounds containing at least one ether group and having a molecular weight of about 144 to about 20,000, at least one of the two ether groups containing at least about 8 carbon atoms;

fatty compounds containing at least one amino group or one quaternary ammonium salt and having a molecular weight of about 129 to about 20,000, at least one of the three or four groups arranged around the nitrogen atom containing at least about 8 carbon atoms;

fatty compounds containing at least one amide group and having a molecular weight of about 157 to about 20,000, the acid component of the amide containing at least about 8 carbon atoms;

at least about $C_8$ fatty compounds containing at least one epoxide group and having a molecular weight of about 128 to about 20,000;

at least about $C_8$ fatty compounds containing at least one anhydride group and having a molecular weight of about 210 to about 20,000;

at least about $C_8$ organophosphorus fatty compounds having a molecular weight of about 193 to about 20,000;

at least about $C_8$ organoboron fatty compounds having a molecular weight of about 174 to about 20,000;

at least about $C_8$ organosulfur fatty compounds having a molecular weight of about 164 to about 20,000;

at least about $C_8$ fatty compounds containing at least one urethane group and having a molecular weight of about 213 to about 20,000; and mixtures thereof.

29. A process for the production of the delayed gas-generating blowing agent claimed in claim 1, which comprises the steps of:

contacting an acidic component or a gas-generating component or both components separately from one another with a water-containing dispersion or solution, which comprises at least one water-swellable, water-redispersible or water-soluble substance selected from the group consisting of synthetically modified, naturally occurring polymers, synthetic polymers and mixtures thereof, for a time sufficient for a film-forming coating to form; and removing any excess solvent.

30. A process for the production of the delayed gas-generating blowing agent claimed in claim 1, comprising the steps of:

contacting an acidic and/or gas-generating component with a dispersion or solution containing a non-aqueous solvent, which comprises at least one water-swellable, water-redispersible or water-soluble substance selected from the group consisting of synthetically modified, naturally occurring, synthetic polymers and mixtures thereof, for a time sufficient for producing a film-forming coating; and removing any excess solvent.

31. A pack comprising the composition claimed in claim 1, in which the particulate, setting gypsum, a blowing agent are present together in a pack, the volume of the pack being selected so that a water-containing liquid can be added at least in a quantity sufficient for setting.

32. A method for the production of in-situ foam, comprising the step of foaming the the composition claimed in claim 1 in-situ to obtain a foam.

33. The method of claim 32, wherein said foam is an assembly foam.

34. The method of claim 32, wherein said foam is an insulating foam.

35. The method of claim 32, further comprising the step of filling voids with said composition, whereby said voids are filled by in-situ foaming of the composition to form a foam filled void.

36. A method for molding, comprising the step of foaming the the compositon claimed in claim 2 in-situ in contact with a mold.

37. The product of combining the composition of claim 1 with water, wherein a light weight gypsum is obtained having a density of about 0.05 to about 1.5 g/cm$^3$.

38. The light weight gypsum of claim 37, wherein the light weight gypsum is in the form of a rigid-foam gypsum molding.

39. The light weight gypsum of claim 37, wherein the light weight gypsum is in the form of an insulating plaster.

* * * * *

UNITED STATES PATENT AND TRADEMARK OFFICE
CERTIFICATE OF CORRECTION

PATENT NO. : 6,162,839
DATED : December 19, 2000
INVENTOR(S) : Klauck et al.

It is certified that error appears in the above-identified patent and that said Letters Patent is hereby corrected as shown below:

Column 15,
Line 57, after "an", delete ",".

Column 16,
Line 5, delete "seleceted", and insert therefor -- selected --.

Column 18,
Line 2, after "foaming the", delete "the".
Line 14, after "foaming the", delete "the composiiton", and insert therefor -- composition --.

Signed and Sealed this

Twenty-eighth Day of October, 2003

JAMES E. ROGAN
*Director of the United States Patent and Trademark Office*